United States Patent
Hayashi (10) Patent No.: US 8,116,180 B2
(45) Date of Patent: Feb. 14, 2012

(54) OPTICAL DISC RECORDING DEVICE AND RECORDING METHOD THEREOF

(75) Inventor: Hiroyuki Hayashi, Yokohama (JP)

(73) Assignee: Hitachi-LG Data Storage, Inc., Tokyo (JP)

(*) Notice: Subject to any disclaimer, the term of this patent is extended or adjusted under 35 U.S.C. 154(b) by 1016 days.

(21) Appl. No.: 11/841,011

(22) Filed: Aug. 20, 2007

(65) Prior Publication Data

US 2008/0117750 A1  May 22, 2008

(30) Foreign Application Priority Data

Nov. 20, 2006 (JP) ................................ 2006-312755

(51) Int. Cl.
*G11B 5/09* (2006.01)

(52) U.S. Cl. ............... 369/47.5; 369/47.51; 369/47.52; 369/47.53; 369/53.26; 369/53.27; 369/53.3

(58) Field of Classification Search .................. None
See application file for complete search history.

(56) References Cited

U.S. PATENT DOCUMENTS

| 6,067,284 | A | * | 5/2000 | Ikeda et al. | ............... 369/116 |
| 6,529,457 | B1 | * | 3/2003 | Narumi et al. | ........... 369/47.53 |
| 6,967,915 | B2 | * | 11/2005 | Lin | ........................ 369/47.53 |
| 2006/0171270 | A1 | * | 8/2006 | Tsukada | ................... 369/47.5 |
| 2006/0203647 | A1 | * | 9/2006 | Yu et al. | ..................... 369/47.53 |
| 2007/0041293 | A1 | * | 2/2007 | Lee et al. | .................. 369/47.53 |
| 2008/0117750 | A1 | * | 5/2008 | Hayashi | ..................... 369/47.5 |

FOREIGN PATENT DOCUMENTS

| JP | 2000-251254 | 9/2000 |
| JP | 2003-168211 | 6/2003 |
| JP | 2005-050411 | 2/2005 |
| JP | 2006-134444 | 5/2006 |
| JP | 2006-216128 | 8/2006 |

* cited by examiner

*Primary Examiner* — Joseph Haley
*Assistant Examiner* — Ifedayo Iluyomade
(74) *Attorney, Agent, or Firm* — Antonelli, Terry, Stout & Kraus, LLP.

(57) ABSTRACT

An optical disc recording device according to the present invention is capable of quickly performing the OPC operation for a rewritable optical disc, and is also capable of setting the proper writing power for both an unwritten area and a written area. A microcomputer reads out, from a memory, preliminary writing conditions for the optical disc in question, and then performs preliminary writing so that data is written to a test writing area of the optical disc under the preliminary writing conditions. After that, test writing to the test writing area, which has been subjected to the preliminary writing, is performed with the writing power being changed, and thereby the optimum writing power is determined. Information about the writing power and the erasing power is stored in the memory on an optical disc type basis. The information is used for the preliminary writing.

1 Claim, 7 Drawing Sheets

| DISC ID | WRITING POWER (Po) | ERASING RATIO (Pe/Po) | MODULATION FACTOR (γ TARGET) | MULTIPLIER COEFFICIENT (ρ) |
|---|---|---|---|---|
| ABC-RW6x | 28mW | 24% | 1.4 | 1.3 |
| | TIMING PARAMETERS | | | |
| | [52, 52, 52, 58, 58, 58, 60, 60, 60, 60, 60, 60, 60, 60, 60, ·········] | | | |

FIG.8A POWER MARGIN AT THE TIME OF DOUBLE SPEED

FIG.8B POWER MARGIN AT THE TIME OF QUADRUPLE SPEED

FIG.8C POWER MARGIN AT THE TIME OF 6X SPEED

OPTICAL DISC RECORDING DEVICE AND RECORDING METHOD THEREOF

CLAIM OF PRIORITY

The present application claims priority from Japanese application serial No. JP2006-312755, filed on Nov. 20, 2006, the content of which is hereby incorporated by reference into this application.

BACKGROUND OF THE INVENTION

1. Field of the Invention

The present invention relates to an optical disc recording device for recording data to a rewritable optical disc, and a recording method thereof.

2. Description of the Related Art

As the background art of this technical field, there is, for example, the technology disclosed in JP-A-2003-168211 (patent document 1). The patent document 1 describes the steps of: irrespective of a state of a test writing area, more specifically, irrespective of whether the test writing area is in an unwritten state or in a written state, irradiating the test writing area with a continuous light beam at a power level Pe to perform erasing, before test writing is executed; after that, performing the test writing to determine writing conditions; and when the writing conditions are determined, performing "erasure before writing" with the erasing power Pe with which a ratio (Mr/Mu) of a modulation factor Mr of a signal written after the test writing area in the written state is irradiated with the erasing power Pe to a modulation factor Mu of a signal written after the test writing area in the unwritten state is irradiated with the erasing power Pe falls within a range from 0.95 to 1.05.

In addition, as the background art of this technical field, there is, for example, the technology disclosed in JP-A-2000-251254 (patent document 2). The patent document 2 describes that a test writing area of a recording medium is irradiated with a laser beam to compulsorily execute write operation the given number of times so that recording properties of the test writing area are stabilized.

In addition, as the background art of this technical field, there is, for example, the technology disclosed in Japanese Patent Application Laid-Open No. 2006-216128 (patent document 3). The patent document 3 describes the steps of: when a target area to be written is an unwritten area, determining the optimum writing power by use of an unused test writing area; and when a target area to be written is a written area, performing preliminary writing to a test writing area with the writing laser power, which has been used for data writing to the target area to be written, and then determining the optimum writing power by use of the test writing area that has been subjected to the preliminary writing.

SUMMARY OF THE INVENTION

Heretofore, when data is written to a rewritable optical disc (rewritable disc) such as a DVD±RW, test writing is executed to perform OPC (Optimum Power Control) operation before writing, and thereby the optimum writing conditions including the writing power are determined. At this time, a target area to be written for test writing is either in an unwritten state or in a written state. However, optimum writing conditions determined in the OPC operation may differ between the unwritten state and the written state. In particular, at the time of overwriting, more specifically, at the time of rewriting new data to a written area, it is necessary to more properly determine writing conditions therefor.

The patent document 1 does not take into consideration the problem that depending on a state of the target area to be written for test writing, the optimum writing conditions determined in the OPC operation change. In addition, depending on a state of a current test writing area, it is not possible to provide a stable test writing area only by erasing operation, which is another problem to be solved.

Moreover, taking such a change in overwrite properties of a rewritable disc into consideration, the following technique is proposed as an example of improved OPC operation.

According to the technology disclosed in the patent document 2, the test writing area of the recording medium is irradiated with a laser beam beforehand to compulsorily execute the write operation the given number of times so that recording properties of the test writing area are stabilized. Then, test writing is executed as the OPC operation by use of the stabilized test writing area so that the optimum laser power is determined.

According to the technology disclosed in the patent document 3, when a target area to be written is an unwritten area, the OPC operation is performed by use of an unused test writing area. In addition, when the target area to be written is a written area, preliminary writing to the test writing area is performed with the writing power, which has been used for data writing to the target area to be written, and then the OPC operation is performed by use of the test writing area that has been subjected to the preliminary writing.

According to the technologies disclosed in the patent documents 2, 3, with the objective of stabilizing the test writing area, the preliminary writing is executed before the OPC operation is performed. However, both of the technologies have problems as described below.

According to the patent document 2, with the objective of stabilizing the test writing area, overwriting (DOW stabilization processing) is executed at least twice, preferably ten times or more, before the OPC operation. Accordingly, a very long time is required to complete the whole OPC operation, which makes it difficult to quickly execute actual write operation.

According to the patent document 3, the preliminary writing is performed with the writing power, which has been used for data writing to the written area. However, if this method is used, the writing power at the time of rewriting will be always set at a higher value. Therefore, a matter of concern is that the life span of the rewritable disc (more specifically, the number of times the rewritable disc is rewritten) will be shortened. It is because the optimum writing power for the unwritten area is usually larger than that for the written area. Accordingly, performing the preliminary writing with the large writing power causes the optimum writing power, which is subsequently required for the OPC operation, to be set at a larger value.

Moreover, the judgment as to whether a target area to be written is an unwritten area or a written area, the execution of different test writing on an area basis, and writing of data with the different writing power on an area basis, are complicated processing that hinders the achievement of high-speed writing.

Furthermore, all of the above-described patent documents do not disclose the point that operation performed before the OPC processing is changed in response to the speed.

Objects of the present invention are to quickly perform the OPC operation, and to set the proper writing power for both the unwritten area and the written area.

The objects of the present invention can be achieved by performing preliminary writing to a test writing area of an optical disc under preliminary writing conditions, and then by using the test writing area, which has been subjected to the preliminary writing and then erased, to perform test writing with the writing power being changed.

According to the present invention, it is possible to achieve the stabilization of the writing quality.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE PREFERRED EMBODIMENTS

Embodiments of the present invention will be described with reference to drawings as below.

Figure 1:
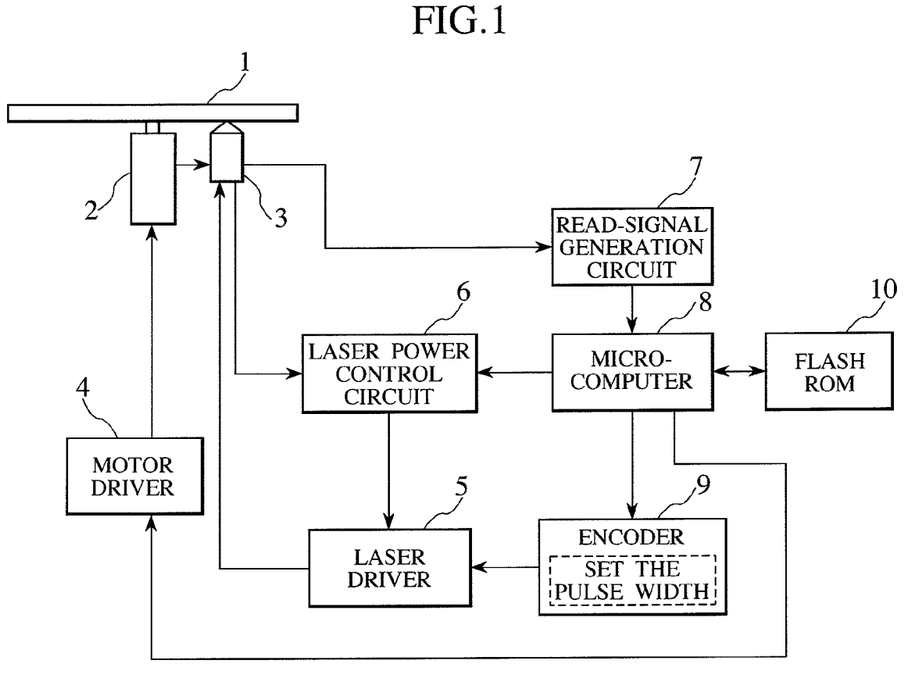
FIG. 1 is a block diagram illustrating one embodiment of an optical disc recording device according to the present invention.

FIG. 1 is a block diagram illustrating one embodiment of an optical disc recording device according to the present invention. An optical disc 1 is, for example, a rewritable recording medium (rewritable disc) such as a DVD±RW disc. A disc motor 2 drives and rotates the mounted optical disc 1. An optical pickup 3 irradiates a recording surface of the optical disc 1 with a laser beam, which is generated by a laser light source (semiconductor laser), so as to write/read data. A sled mechanism, which is not illustrated, moves the optical pickup 3 to a desired track position on the optical disc 1. A motor driver 4 supplies the disc motor 2 with a rotation driving signal.

A laser driver 5 supplies the laser light source with a driving signal for emitting a laser beam. A laser power control circuit 6 controls the laser driver 5 so that the power of the laser beam emitted from the laser light source becomes a specified value.

A read-signal generation circuit 7 generates an RF signal from a signal of light reflected by the optical disc, the signal being detected by the optical pickup 1. A microcomputer 8 performs test writing by use of a test signal, before data is written to the optical disc 1. Next, the microcomputer 8 evaluates a read signal (RF signal) obtained by reading the data, and thereby determines optimum writing conditions (OPC operation). The microcomputer 8 then writes the data under the optimum writing conditions. An encoder 9 forms a pulse pattern of the test signal, and then supplies the laser driver 5 with the pulse pattern.

In this embodiment, if the OPC operation is performed to write to the rewritable disc, writing (preliminary writing) is executed under writing conditions in which a test writing area is verified beforehand. After that, the normal OPC operation is performed. A memory (flash ROM) 10 stores conditions (the recording power and the erasing power) of the preliminary writing on a disc basis beforehand. The microcomputer 8 performs the preliminary writing with reference to the conditions.

Incidentally, a data read/write system and a servo system are omitted in FIG. 1. The microcomputer 8 transfers, to/from a host computer, a command, and data used for reading/writing. The encoder 9 converts write data into a pulse pattern. The laser power control circuit 6 sets the optimum writing power for writing the data. The read-signal generation circuit 7 acquires read data from a detection signal detected by the optical pickup 3, and generates a tracking error signal and a focus error signal. A servo controller controls motor rotation, tracking, focusing, and the like, on the basis of the read signals.

Next, preliminary writing conditions of the OPC operation according to this embodiment will be described.

Figure 2:
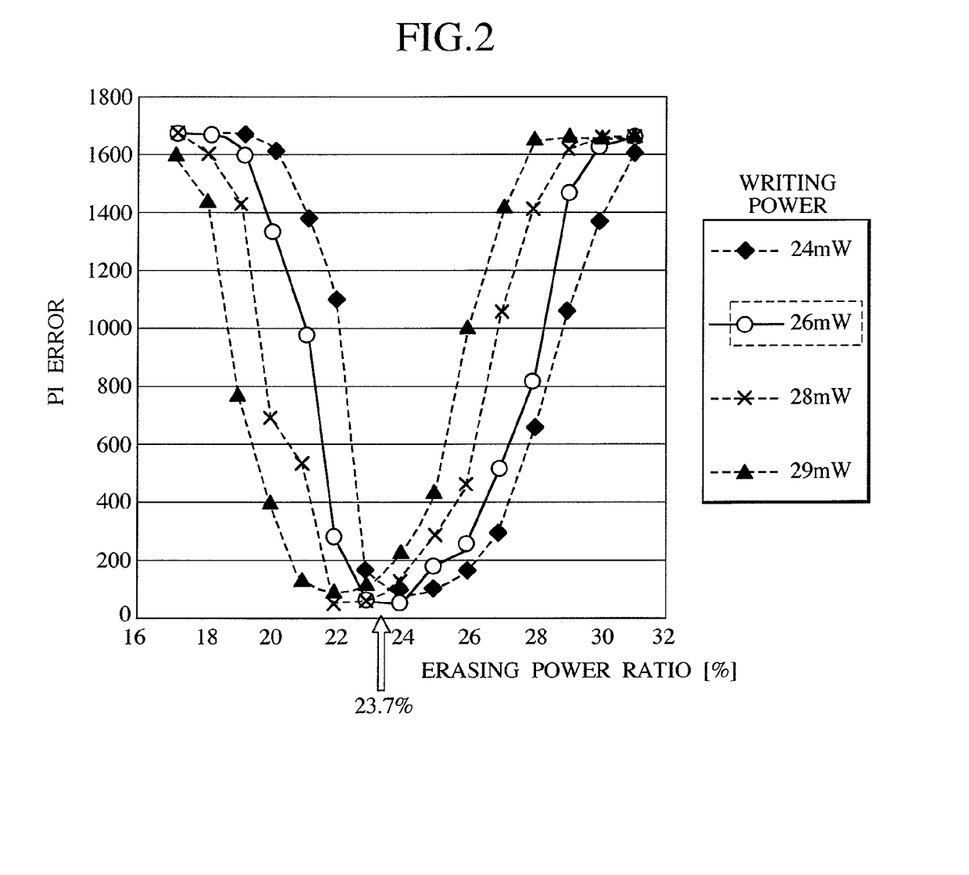
FIG. 2 is a chart illustrating how to determine the preliminary writing conditions.

FIG. 2 is a chart illustrating how to determine the preliminary writing conditions. Write/erase tests of a target rewritable disc are performed beforehand with the writing power and the erasing power being used as parameters so that the writing quality (the error amount: PISUM) is evaluated. The writing quality of rewritable discs fluctuates depending on the number of times writing has been performed. Therefore, the writing quality is evaluated at the time of the second writing (DOW1) at which the margin thereof becomes narrow. In FIG. 2, conditions in which the error amount is small, whereas the margin is large, are determined as follows: the writing power=26 mW; and an erasing power ratio (the erasing power/the writing power)=23.7%. These conditions are used as the preliminary writing conditions. Incidentally, in the case of the preliminary writing, in order to eliminate the influence of a base (writing history), it is desirable to set the conditions at values that are a little higher than those of the writing power conditions determined as described above.

Figure 3:
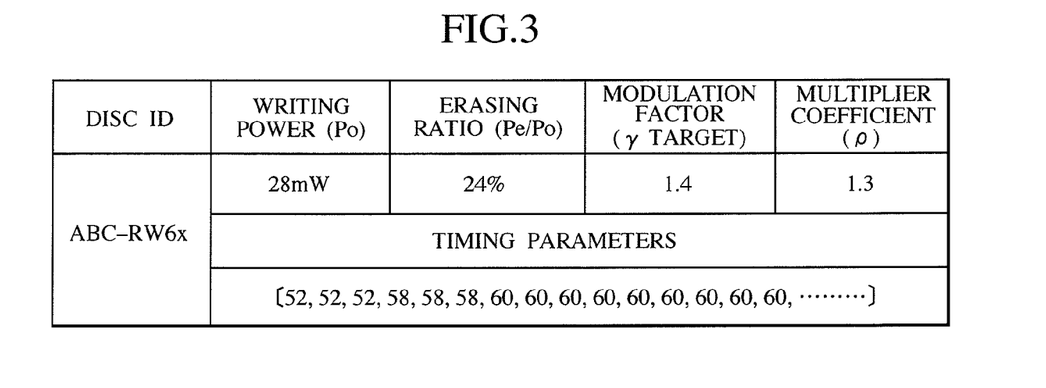
FIG. 3 is a table illustrating an example of preliminary writing conditions to be stored in the memory (flash ROM)

FIG. 3 is a table illustrating an example of preliminary writing conditions to be stored in the memory (flash ROM). The table describes, on a disc ID (disc type) basis, the writing power (Po), the erasing power (Pe), and an erasing power ratio (Pe/Po), which have been verified beforehand by testing. In this example, recommendation values are described as follows: the writing power (Po)=28 mW; and the erasing power ratio (Pe/Po)=24%. Incidentally, other data, which is described in the table as parameters used at the time of performing the OPC operation, includes a target value of an normalized tilt γ of a modulation factor, a multiplier coefficient ρ, and a timing parameter of a write pulse. These pieces of data are stored as firmware that is used to execute the OPC operation including the preliminary writing.

Figure 4:
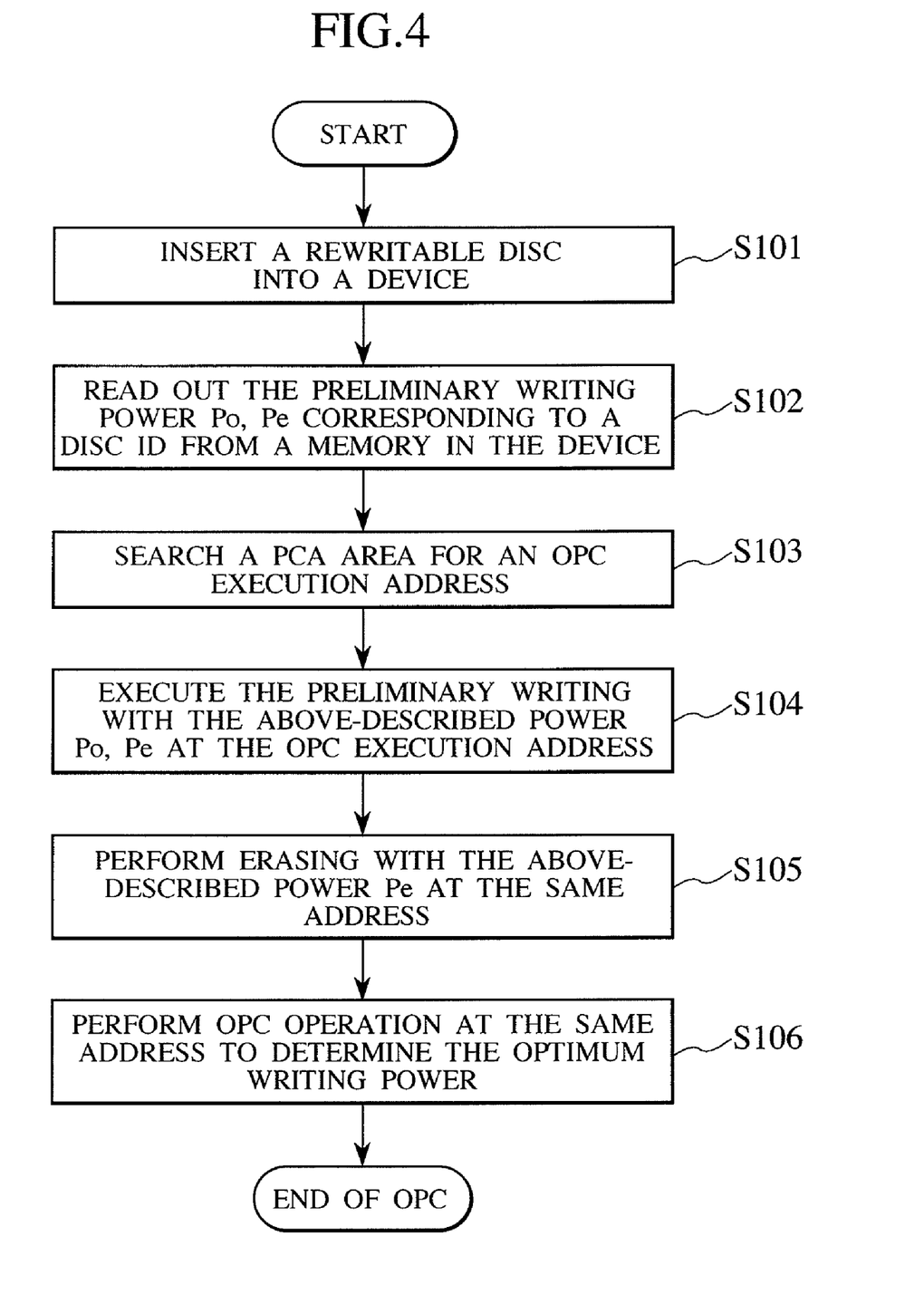
FIG. 4 is a flowchart illustrating the flow of the OPC operation according to this embodiment.

FIG. 4 is a flowchart illustrating the flow of the OPC operation according to this embodiment.

Step S101: inserting a rewritable disc into a device.

Step S102: referring to the memory (flash ROM) to identify a disc ID, and then reading out data including registered preliminary writing conditions (the writing power Po, the erasing power Pe) corresponding to the disc ID.

Step S103: searching the test writing area (PCA) for an OPC execution address portion.

Step S104: performing the preliminarily writing in the OPC execution address portion with the writing power Po and the erasing power Pe that have been read out (in this case, irrespective of a state of the writing area, more specifically, irrespective of whether the written area is in a written state or in an unwritten state, the preliminary writing is performed under the same conditions).

Step S105: erasing, with the erasing power Pe, data that has been written in the address portion.

Step S106: executing the OPC operation in the address portion to determine the optimum writing power.

Thus, a main feature of this embodiment is that the preliminary writing and erasing are performed in the steps S104, S105 before the OPC operation is executed in the step S106 so as to stabilize the recording properties of the rewritable disc. In this case, irrespective of a state of the writing area, more specifically, irrespective of whether the writing area is in an unwritten state or in a written area, the preliminary writing is performed under the same conditions.

According to this embodiment, because the number of times the preliminary writing is performed is one, conditions therefor (the writing power and the erasing power) can be immediately set by reading out them from the memory. Therefore, the length of time required for the preliminary writing can be shortened to a large extent. In addition, irrespective of a state of the writing area, more specifically, irrespective of whether the writing area is in an unwritten state or in a written state, data is written by using in common the optimum writing power that has been determined in the OPC operation after the preliminary writing is performed. In this case, the optimum writing power in question may deviate from the actual optimum writing power required for the unwritten area. However, because a margin of the writing power required for the unwritten area is basically wide, the common use of the writing power makes it possible to reduce the deterioration in writing quality. Thus, irrespective of a state of the writing area, more specifically, irrespective of whether the writing area is in an unwritten state or in a written state, the common OPC steps are used. Therefore, the process is simplified, which contributes to the speeding up of the write operation.

Incidentally, the preliminary writing is required to stabilize the test writing area (PCA). For example, if data has been written to the test writing area in the past, and at the same time if the data has been written to the test writing area with the excessive power by another device, or the like, it is not possible to completely erase the data only by the erase operation; in other words, some unerased data remains. If the OPC operation which changes the power in stages in the test writing area is executed with the unerased data in question remaining, a modulation factor (m) on the low power side is influenced by the unerased data. As a result, the determined writing power is not stable, which is a problem that has been found out. For this reason, according to this embodiment, by temporarily overwriting with the writing power Po and the erasing power Pe, which are the preliminary writing conditions, it is possible to reduce the influence that is exerted on other devices. Then, by erasing data written to the test writing area with the erasing power, which is one of the preliminary writing conditions, before the OPC operation is performed, it is possible to acquire a stable test writing area.

Moreover, even if the test writing area is in the unwritten state, as is the case with the test writing area that is in the written state, temporary overwriting with the writing power Po and the erasing power Pe, which are the preliminary writing conditions, makes it possible to reproduce the same conditions as those of the test writing area that is in the written state. Therefore, it is possible to determine the stable writing power from the OPC operation irrespective of a state of the test writing area.

In addition, in the step S104, data is written once to the test writing area (in this embodiment, 2ECC on the inner circumferential side, and 4ECC on the outer circumferential side) with the writing power Po and the erasing power Pe, which are the preliminary writing conditions, before the process proceeds to the step S105. As a result, the length of time required to perform the preliminary writing to the test writing area twice or more is shortened, and accordingly it is possible to further reduce the processing time.

Figure 8A:
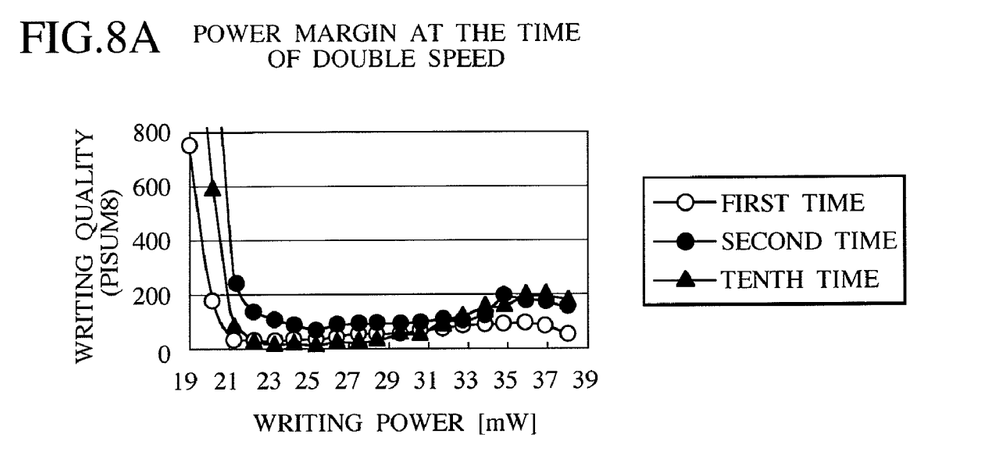
FIGS. 8A, 8B, 8C are charts, each of which compares the difference in power margin (DVD-RW 6× disc) on a writing speed basis.
Figure 8B:
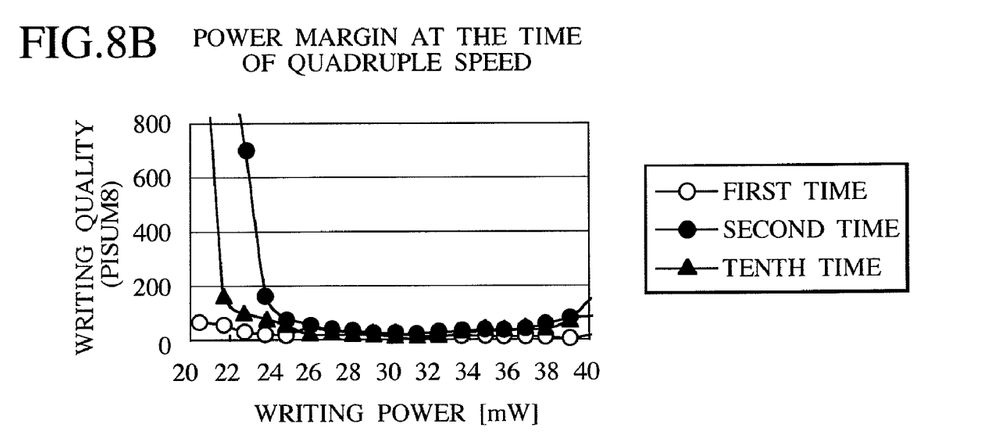
Figure 8C:
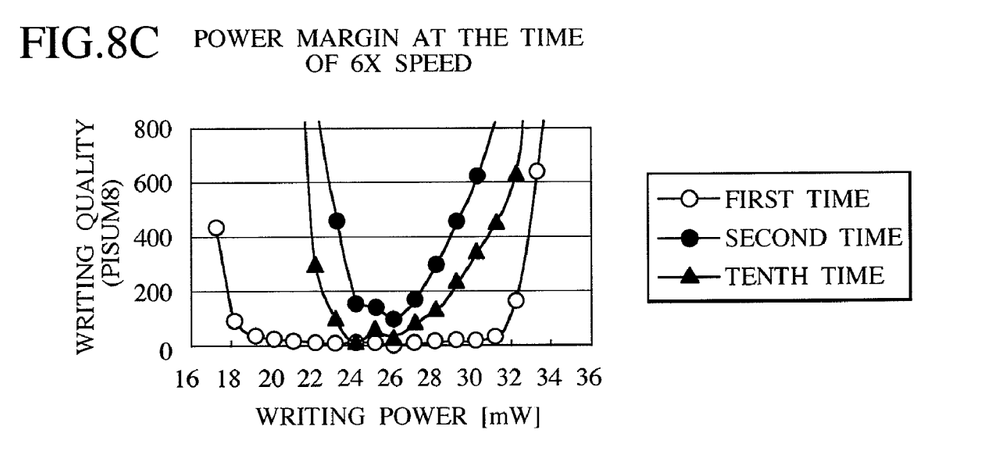

FIGS. 8A, 8B, 8C are charts, each of which compares the difference in power margin of a DVD-RW 6× disc on a writing speed basis. Thus, in response to the writing speed, a writing power margin for the next time or later changes. As shown in FIG. 8A, because the margin is large at the time of the low speed operation (double speed), the steps S104, S105 are skipped without performing the preliminary writing. Accordingly, the process proceeds from the step S103 to the step S106. On the other hand, as shown in FIG. 8C, because the margin is small at the time of the high speed operation (6× speed), a method in which the above-described preliminary writing is performed before proceeding to the step S106 becomes effective. As a result, at the time of the low speed operation whose margin is large, it is possible to shorten the length of time because the preliminary writing is not performed. On the other hand, at the time of the high speed operation whose margin is small, the preliminary writing is performed. Therefore, it is possible to ensure the stable writing quality.

Incidentally, the OPC operation in the step S106 is performed as follows:

(1) determining the reference writing power (Pind) required for the OPC operation with reference to the optimum writing power (Pwo) recommended for the disc in question (the reference writing power (Pind) is calculated by the following equation: Pind=Pwo/ρ (multiplier coefficient));

(2) performing test writing to a PCA area with the writing power Pw being changed with respect to the reference writing power (Pind);

(3) reading a test writing portion to measure a modulation factor m of a RF signal (here, the modulation factor m=(Ip (peak value)−Ib (bottom value))/Ip (peak value));

(4) determining a normalized tilt γ of the modulation factor m (here, γ=(Δm/m)/(ΔPw/Pw)).

(5) determining the writing power Ptarget whose normalized tilt γ is a target γ value;

(6) multiplying the writing power Ptarget by ρ (multiplier coefficient) to determine the optimum writing power Pwo.

Next, effects of this embodiment will be described with reference to a specific example.

Figure 5A:
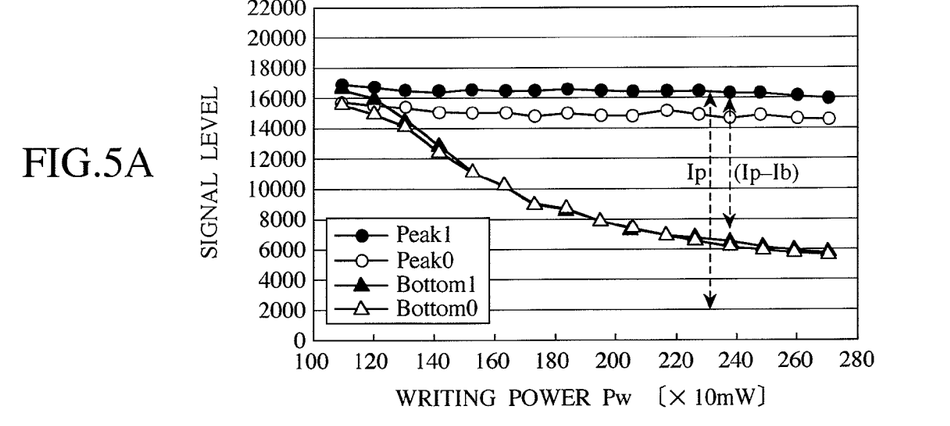
FIGS. 5A, 5B, 5C are charts illustrating an example of the optimum writing power required when the OPC operation is performed without executing the preliminary writing.
Figure 5B:
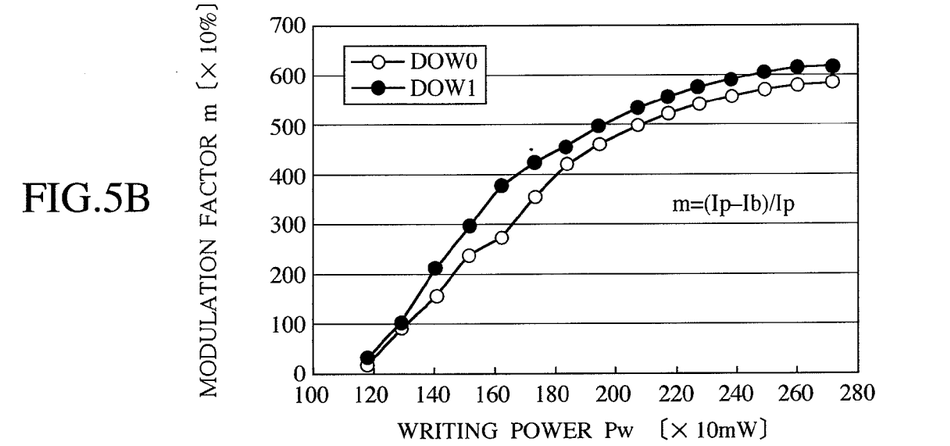
Figure 5C:
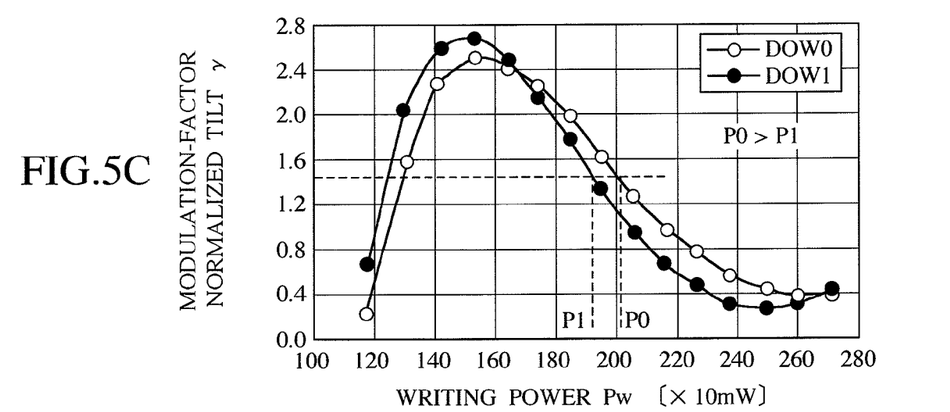

FIGS. 5A, 5B, 5C are charts that illustrate, for comparison, an example of the optimum writing power required when the OPC operation is performed without executing the preliminary writing. FIG. 5A illustrates read RF signal levels (a peak level and a bottom level) with respect to the writing power Pw at the time of test writing. FIG. 5B illustrates a modulation factor m that is calculated from the result of the signal levels shown in FIG. 5A. FIG. 5C illustrates a normalized tilt γ that is determined from the result of the modulation factor shown in FIG. 5B. Here, the writing power with which γ becomes a target value (1.4 in this example) is assumed to be Ptarget.

In this case, as shown in FIG. 5A, there is a difference in peak level of the RF signal between a case where the disc is in an unwritten state (DOW0) and a case where the disc is in a state in which writing has been performed once (DOW1).

Accordingly, curves of the modulation factor m shown in FIG. 5B deviate from each other; and curves of the normalized tilt γ shown in FIG. 5C also deviate from each other. As a result, P0 (Ptarget for DOW0) is 20.2 mW; P1 (Ptarget for DOW1) is 19.1 mW; and the difference in writing power Ptarget is about 6%. In addition, it is understood that this difference is a factor in the deterioration in writing quality.

Figure 6A:
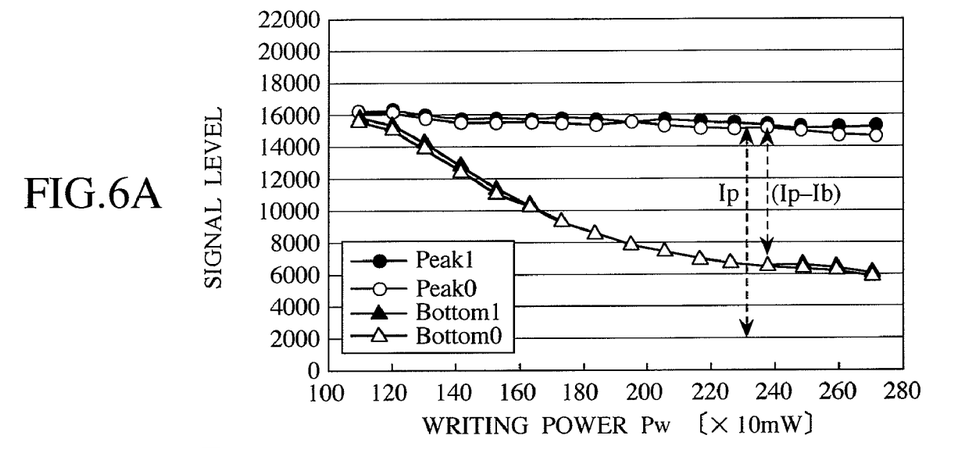
FIGS. 6A, 6B, 6C are charts illustrating an example of the optimum writing power required when the preliminary writing is executed before the OPC operation is performed.
Figure 6B:
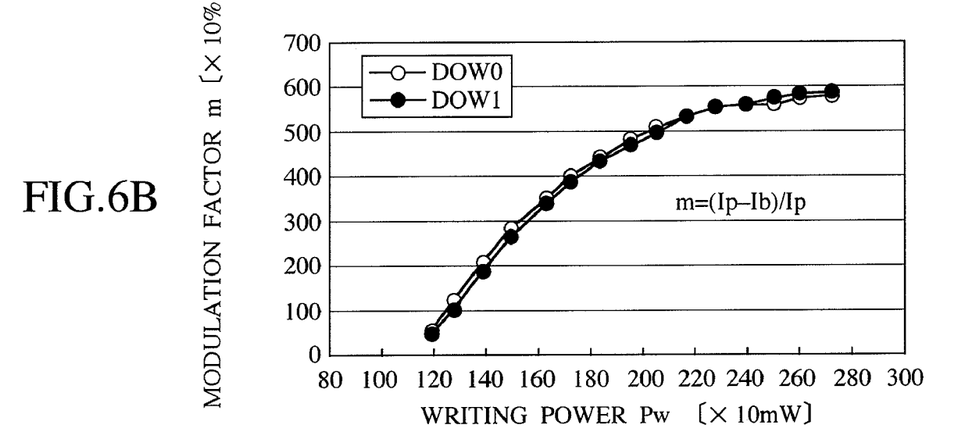
Figure 6C:
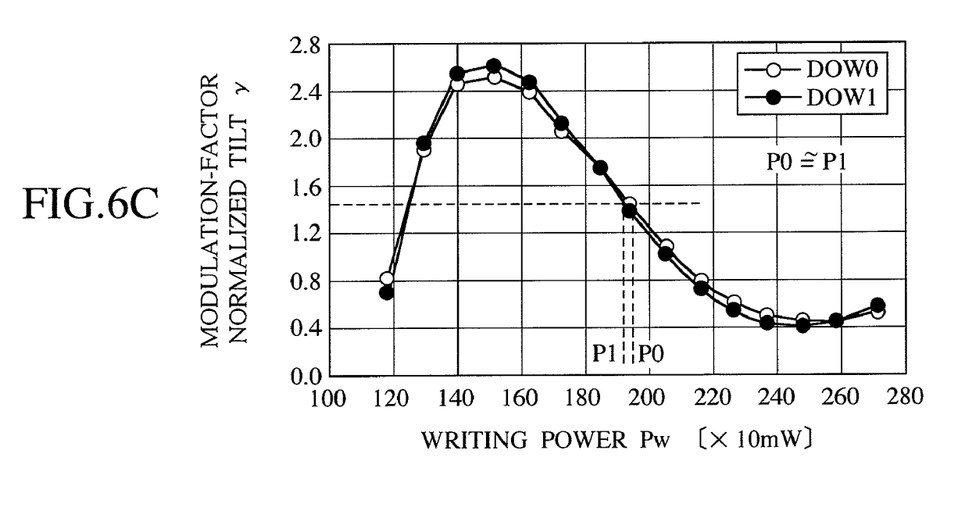

In contrast to the above-described charts, FIGS. 6A, 6B, 6C are charts that illustrate an example of the optimum writing power required when the preliminary writing according to this embodiment is executed before the OPC operation is performed. Writing to, and erasing from, both a disc in an unwritten state (DOW0) and a disc in a state (DOW1) in which writing has been performed once are performed with the writing power Po=25 mW, and with an erasing power ratio (Pe/Po)=24%, which are preliminary writing conditions. Then, the OPC operation is performed. With respect to the writing power Pw at the time of test writing, FIGS. 6A, 6B, 6C illustrate a level of a read RF signal, a modulation factor m, and a normalized tilt γ respectively.

As a result of the preliminary writing, there is little difference in properties between the unwritten state (DOW0) and the state (DOW1) in which writing has been performed once. Accordingly, the difference in Ptarget determined from FIG. 6C is reduced to about 1%. As a cause of the above, it is presumed that base conditions are stabilized by the preliminary writing, which causes the level in the unwritten state (DOW0) to be improved at the peak level of the RF signal shown in FIG. 6A. Thus, the OPC operation of writing to a rewritable disc is stabilized, and consequently it is possible to ensure the writing quality at the time of data rewriting.

Figure 7:
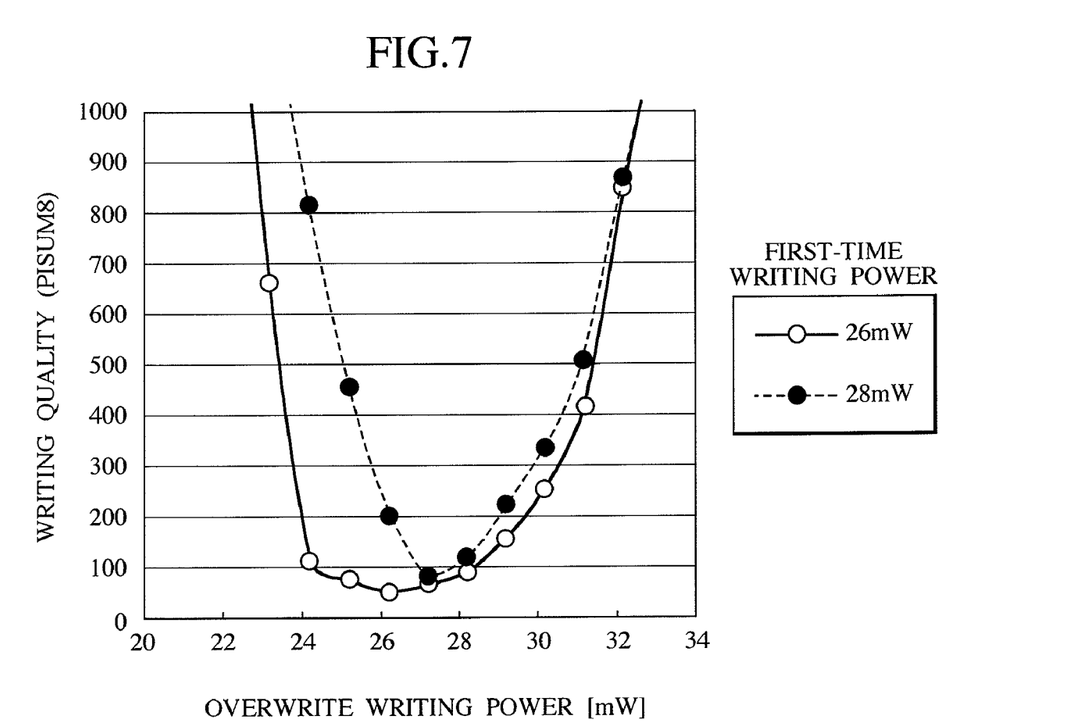
FIG. 7 is a chart illustrating the influence exerted on the writing quality when the first-time writing power is larger than the overwrite writing power.

Incidentally, FIG. 7 is a chart illustrating effects that can be acquired from the stabilization of the OPC operation. As an example of the relationship in which the first-time writing power (in an unwritten state) is larger than the overwrite writing power (in a written state), which is the conventional problem, the first-time writing to an area is performed with 26 mW (the OPC power at the time of overwriting) and with 28 mW (the first-time estimated power), and then overwriting to the same area is performed with the writing power being changed within a range from 20 to 34 mW. After that, reading is performed. FIG. 7 illustrates a change in writing quality (PISUM8) obtained at this point of time. If the first-time writing is performed with 28 mW and then the overwriting is performed with 26 mW, in other words, if the first-time writing power is larger than the overwrite writing power, it is understood that the stable writing quality cannot be achieved. On the other hand, as is the case with this embodiment, if the first-time writing power (in the unwritten state) is set at 26 mW that is the same as the writing power at the time of the overwriting (in the written state), it is possible to achieve the excellent writing quality. As a result of the processing described above, irrespective of a state of the test writing area, more specifically, irrespective of whether the test writing area is in an unwritten state or in a written state, it is always possible to ensure the stable writing quality.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. An optical disc recording device for irradiating a rewritable optical disc with a laser beam to record data, the optical disc recording device comprising:
  a disc motor which rotates the optical disc;
  an optical pickup which irradiates the optical disc with the laser beam to detect reflected light from the optical disc;
  a laser power controller which controls the power of the irradiated laser beam; and
  a microcomputer which performs OPC operation to determine the writing power, and instructs the laser power controller to write data on the basis of the writing power, wherein:
  in high speed operation, the microcomputer executes preliminary writing to a test writing area of the optical disc before the OPC operation is performed, whereas in low speed operation, the microcomputer performs the OPC operation without executing the preliminary writing to the test writing area of the optical disc.

* * * * *